United States Patent [19]

McCoy et al.

[11] 4,379,177

[45] Apr. 5, 1983

[54] STABLE DEHYDRATED COCRYSTALLINE AMINO ACID FOOD ADDITIVES

[75] Inventors: Stephen A. McCoy, Villa Hills, Ky.; James L. Bono, Cincinnati, Ohio

[73] Assignee: The Procter & Gamble Company, Cincinnati, Ohio

[21] Appl. No.: 328,989

[22] Filed: Dec. 9, 1981

Related U.S. Application Data

[63] Continuation of Ser. No. 164,977, Jul. 1, 1980, abandoned, which is a continuation-in-part of Ser. No. 55,224, Jul. 5, 1979, abandoned.

[51] Int. Cl.$^3$ ............................ A23J 3/00; A23L 1/30
[52] U.S. Cl. ................................ 426/656; 426/648; 260/501.11
[58] Field of Search ................. 426/656, 548, 648; 260/501.11

[56] References Cited

U.S. PATENT DOCUMENTS 2,850,387  9/1958  Town ................................. 426/656
2,851,482  9/1958  Barker et al. ...................... 426/656
2,945,049  7/1960  Chang et al. ...................... 426/656
3,024,272  3/1962  Hyson et al. ...................... 426/656
3,697,287 10/1972  Winitz ................................. 99/1
4,024,286  5/1977  Cornelius et al. ............... 426/657 X

OTHER PUBLICATIONS

Chemical Abstracts 89, 102281x (1978), Lomteva et al.
Pfeiffer et al., "The Salting Out of Amino Acids", Z. Physiol. Chem., 133, 180-192, (1924).

Primary Examiner—Robert A. Yoncoskie
Attorney, Agent, or Firm—Rose Ann Dabek; Leonard Williamson; Richard C. Witte

[57] ABSTRACT

This invention relates to improved nutritionally useful, amino acid food additives, the method of making them and the fortification of foodstuffs which are deficient in the nutritionally related amino acids. This improved amino acid food additive comprises: a uniform dehydrated cocrystalline matrix of (1) an amino acid material, preferably a salt of an essential amino acid material, and (2) an effective amount of a soluble edible cocrystallizer material, preferably sodium chloride, whereby the improved amino acid food additive provided is better-tasting, more stable and less hygroscopic than the free amino acid material alone.

6 Claims, No Drawings

STABLE DEHYDRATED COCRYSTALLINE AMINO ACID FOOD ADDITIVES

This is a continuation of application Ser. No. 164,977, filed July 1, 1980, now abandoned, which is a continuation-in-part of Ser. No. 055,224, filed July 5, 1979, now abandoned.

BACKGROUND OF THE INVENTION

This invention relates to improved nutritionally useful, amino acid food additives, the method of making them and the fortification of foodstuffs which are deficient in the nutritionally related amino acids. The term "amino acid material" is meant to encompass nutritionally useful amino acid compounds per se, whether they are in the form of amino acid derivatives, their esters, salts or mixtures thereof. The term "proteinaceous foodstuff" is meant to encompass protein per se, whether derived from vegetable or animal sources, and additionally, to manufactured products intended for human or animal consumption containing such proteins as a significant component.

There is considerable impetus to satisfy the protein requirement in the diet of man with protein derived exclusively from vegetable sources. There are essentially two reasons which compel human populations to look to vegetable proteins for a substantial, if not an exclusive, source of dietary protein. The paramount reason is one of efficiency. That is, at least in certain parts of the world, it is no longer feasible, from the standpoint of consumption of energy, to grow a crop, to feed livestock, to obtain required dietary protein. The second reason is best couched in terms of nutrition and health. Manufactured foodstuffs based on vegetable proteins afford the possibility of ultimately achieving a perfect balance of nutrients with controlled exclusion of certain identified detrimental agents, such as cholesterol. And, there are subsidiary reasons involving the factor of convenience, and, to some, reasons of personal conviction.

There appears to be no question as to the capacity to obtain vegetable proteins in sufficient quantity. Success in the agriculture of, for example, the legumes (and in particular soy and peanut) have assured the ready procurement of vegetable protein in quantity. And this assurance of quantity is, in part, attributable to the development of associated technologies to exploit and make available this source of native vegetable protein. George Washington Carver, e.g., is famous for his pioneer work in developing numerous ways of preparing and growing the peanut and other vegetable protein for human consumption.

Now the principal concern is one of quality of that vegetable protein. If the vegetable protein is not nutritionally the equivalent of protein derived from animal sources, that is, of comparable quality, the fact that the vegetable protein is obtainable in quantity is of lessened significance. The fact is that proteins derived from a chosen plant species source are not of comparable nutritional quality to animal sources. This is evident, in part, by examination of the amino acid content, or profile, of a chosen plant protein. For example, peanut protein is deficient in the sulfur-containing amino acids, such as methionine; wheat gluten is deficient in lysine. Nutritionists have applied the term "limiting" to such amino acids, and have noticed that a protein characterized by a particular limiting essential amino acid is effectively levelled in nutritive value to the content of the first limiting amino acid. For example, if a certain vegetable protein was relied upon for the sole source of dietary protein, and if that protein was characterized by an amino acid profile revealing certain limiting amino acids, it would be necessary to consume in the diet an excessive amount of that protein in order to insure the nutritionally required intake of those limiting essential amino acids. Besides the sheer economic waste of such a diet, there is increasing evidence in the scientific literature that excess dietary protein may have detrimental physiological effects.

Fortification of proteinaceous foodstuffs with, e.g., sulfur-containing amino acids, and particularly with respect to methionine, has typically involved direct addition of DL-methionine as the free acid. However, all attempts to fortify methionine deficient foodstuffs with free DL-methionine proved unfeasible because of a severely intractable flavor problem. It was discovered that foodstuffs so fortified with DL-methionine developed off-flavors and became discolored. This effect was particularly noticeable for foodstuffs that were either heated prior to eating, or were stored for an indefinite period in a hydrated condition, but the effect was also noticed after dry storage. The chemical basis for the generation of these off-flavors and unsightly discolorations was, in part, attributable to the well-known Strecker degradation—or more commonly, the Maillard reaction (chemical browning). The Maillard reaction is particularly distressing when sulfur-containing amino acids are involved because of the generation and liberation of noxious mercaptans and sulfides, e.g. methional is freely formed in foodstuffs fortified with methionine. Also, distinct from the Maillard reaction, degradative reactions, such as air oxidation of these sulfur-containing amino acids, adversely affect flavor. Needless to say, alternate means were sought to alleviate the sulfur amino acid deficiencies in vegetable derived proteins.

Some prior art methods are designed to defeat the Maillard reaction in the face of free addition of selected amino acids. Representative diverse means suggested by the prior art are: (1) encapsulation of the free amino acid; (2) simultaneous incorporation of certain alleged anti-browning agents, e.g. pyrocarbonic acid esters, and O-carboxy anhydrides of α-anhydroxy acids (U.S. Pat. No. 3,337,348 granted Aug. 22, 1967); and (3) utilization of the plastein reaction. This last-mentioned means involves the bonding of the added amino acid by peptide linkage to protein molecules which constitute the bulk of the proteinaceous component of the foodstuff. All of the above-listed means are of limited practical utility. Consequently, the prior art continued the search for means in circumvention of the Maillard reaction. Among these means were suggested the utilization of tasteless derivatives of certain amino acids which were relatively inert to degradation yet nutritionally available on ingestion.

For example, some success has been achieved in derivatization of certain sulfur-containing amino acids, especially methionine. For example, Ralph Anthony Damico and Robert Wayne Boggs in U.S. Pat. No. 3,878,305, Apr. 15, 1975, discloses that certain N-acyl L-methionine compounds, exhibit increased stability, attenuated taste characteristics and are nutritionally available. Damico and Boggs in U.S. Pat. No. 3,952,115 achieved additional successes on ester derivations of N-acyl L-methionine. The teachings of U.S. Pat. Nos.

3,878,305 and 3,952,115 are incorporated herein in their entirety.

While the above amino acid derivatives solved some of the aforementioned problems, direct addition of some amino acid derivatives still causes undesirable flavors in certain foodstuffs. In some cases, they have proven to be unstable in some food systems. The addition of NALM, e.g. peanut butter, results in unwanted appearance, flavor and textural changes upon storage conditions.

It is an object of the present invention to reduce or eliminate the undesirable off-flavors of free amino acid food additives.

Another object is to provide a method of dehydrating an aqueous solution of amino acids, their salts and derivatives using conventional drying techniques to provide an amino acid containing powder having a lower hygroscopicity.

Still another object of the present invention is to provide an improved-tasting amino acid fortified proteinaceous foodstuff, particularly peanut butter.

These and other objects will become apparent in the light of this disclosure.

SUMMARY OF THE INVENTION

It has been discovered that neutralization improves the taste of some key amino acid materials because their salts are more bland in many cases. However, due to a strong hydrophilic and hygroscopic nature of those salts, as well as many other amino materials, practical dehydration is difficult, if not impossible. Attempts to dehydrate aqueous solutions of many amino acid materials and particularly neutralized salts of amino acid materials by normal drying techniques result in incomplete drying or decomposition. It has been discovered that an effective amount of a cocrystallizer material mixed with amino acid solutions can be successfully dehydrated using conventional drying techniques In brief, provided herein is an improved amino acid food additive comprising a uniform cocrystalline matrix of (1) an amino acid material, and (2) an effective amount of a soluble edible cocrystallizer material, wherein said improved amino acid food additive is better-tasting, more stable and less hygroscopic than the amino acid material alone.

The amino acid material is preferably selected from the group consisting of: lysine, tryptophan, cystine, cysteine, methionine, threonine, phenylalanine, leucine, valine, isoleucine, histidine, their derivatives, their salts and mixtures thereof. The other essential component of the improved amino acid food additive is a soluble, edible, cocrystallizer material preferably selected from the group consisting of: alkali and alkaline earth metal salts of halides, phosphates and nitrates; polyhydric alcohols; crystalline organic acids and their salts, and mixtures thereof.

The more preferred amino acid materials are the essential amino acids and their derivatives, particularly N-acyl L-methionine compounds and their salts.

The method of the present invention comprises dissolving at least one amino acid material in water along with an effective amount of at least one edible cocrystallizer material. The term "an effective amount" means "enough" to enable successful dehydration of the amino acid cocrystallizer solution. Then the solution is preferably neutralized to form a salt of the amino acid. Generally an effective amount of cocrystallizer material will be such that the ratio by weight of the amount of cocrystallizer to the amount of edible amino acid salt is from about 0.9:1 to about 6:1. Preferably, equal amounts of amino acid and cocrystallizer are used. The final pH range of the solution should be from about 2 to 7 and more preferably 4 to 7. The mixture is then dried using an appropriate technique. Freeze drying is preferred.

The present invention further provides a means of fortifying foodstuffs, particularly peanut butter, with more stable, better-tasting and nutritional amino acid materials comprising adding to said foodstuffs the improved amino acid food additive of this invention.

DETAILED DESCRIPTION OF THE INVENTION

A detailed description of the invention is conveniently presented by discussion of three interrelated topics: (A) identification and preparation of the preferred cocrystalline amino acid food additives; (B) class of proteinaceous foodstuffs affected by this invention; and (C) the significance of a more stable and better-tasting amino acid food additive.

Identification and Preparation of the Amino Acid Food Additive Cocrystallate This invention relates to an improved amino acid food additive comprising a uniform dehydrated cocrystalline matrix of (1) an amino acid material, and (2) an effective amount of a soluble edible cocrystallizer material, wherein said improved amino acid food additive is better-tasting, more stable and less hygroscopic than the amino acid material alone.

The amino acid material is preferably selected from the group consisting of: lysine, tryptophan, methionine, threonine, phenylalanine, leucine, valine, isoleucine, histidine, cystine, cysteine, their derivatives, their salts and mixtures thereof. All nutritionally useful amino acids, their derivatives, particularly their salts and mixtures thereof are contemplated. The other essential component of the improved amino acid food additive is a soluble, edible, cocrystallizer material preferably selected from the group consisting of: alkali and alkaline earth metal salts of halides, phosphates and nitrates, polyhydric alcohols, crystalline cellulose, crystalline starches, crystalline organic acids and their salts, and mixtures thereof. Sodium chloride, although somewhat hygroscopic itself, is surprisingly a more preferred cocrystallizer material. Monosodium glutamate, tartaric acid, sodium tartrate, sodium valerate and suitable vegetable gums can also be used as cocrystallizer material in the practice of this invention.

Other specific cocrystallizer materials contemplated by this disclosure include sugars, and any like edible material which allows the successful dehydration of the amino acid material to provide a stable dehydrated cocrystallate.

The more preferred amino acid materials are the essential amino acids and their derivatives, particularly N-acyl L-methionine compounds and their salts.

TABLE I

| Preferred Amino Acids | |
|---|---|
| Common Name | Chemical Name |
| lysine | alpha, epsilon-diaminocaproic acid |
| tryptophan | alpha amino-3-indolepropionic acid |
| methionine | alpha-amino-gamma-methylmercaptobutyric acid |
| threonine | alpha-amino-beta-hydroxybutyric acid |
| phenylalanine | alpha-amino-beta- |

TABLE I-continued

| Preferred Amino Acids | |
|---|---|
| Common Name | Chemical Name |
| | phenylpropionic acid |
| leucine | 1-amino-4-methylpentanoic acid |
| valine | 2-amino-3-methylbutanoic acid |
| isoleucine | 2-amino-3-methylpentanoic acid |
| histidine | alpha-amino-4 (or 5)-imidazolepropionic acid |

Additional preferred amino acid materials are the salts of N-acetyl L-methionine, and analogous N-acyl derivatives of L-methionine, as well as the N-acyl derivatives of cystine and cysteine. The N-acetyl derivatives of L-methionine, L-cystine, and L-cysteine (N-acetyl L-methionine, N,N'-diacetyl L-cystine, and N-acetyl L-cysteine salts, respectively) are the most preferred supplements, but the invention fully comprehends the useful derivatives of other amino acids, and particularly their salts and mixtures thereof.

A preferred method of the present invention comprises dissolving at least one amino acid material in water along with an effective amount of at least one edible cocrystallizer material. Then the solution is preferably neutralized to form a salt of the amino acid. Generally, an effective amount of cocrystallizer material will be such that the ratio by weight of the amount of cocrystallizer material to the amount of edible amino acid salt is from about 0.9:1 to about 6:1. Equal amounts of amino acid and cocrystallizer appear to work best. Of course, the solution is neutralized with an appropriate edible base like NaOH, Ca(OH)$_2$, KOH, and the like. The final pH range of the solution can be from about 2 to 7 and more preferably 4 to 7. The mixture is then dried using an appropriate technique. Freeze drying is preferred. Thin film evaporation drying and forced air drying are also appropriate techniques.

The present invention further provides a means of fortifying foodstuffs, particularly peanut butter, with more stable and better-tasting amino acid materials comprising adding to said foodstuffs the improved amino acid food additive of this invention.

CLASS OF FOODSTUFFS

The actual method of incorporation of the dehydrated cocrystalline amino acid food additives encompassed by this invention to obtain the fortified proteinaceous foodstuff, is of course controlled by the nature of the particular foodstuff. For materials such as soybean flour, the compositions may be added as dry powders; for manufactured proteinaceous foodstuffs such as nut butters, the cocrystalline amino acid food additives may be incorporated as a minor ingredient, or enter the formulation dispersed in a suitable vehicle, such as oil. However, it is critical that the improved amino acid food additives of this invention remain dry because water will destroy its crystalline structure.

An especially important embodiment of the invention is the fortification of certain proteinaceous source materials, such as the nut butters. Peanut protein is first limiting in lysine, but it is also deficient in threonine and methionine. Consequently, in any scheme of fortification it is necessary to be conscious of the entire amino acid profile of a given proteinaceous material. Such information is readily available from published tables of amino acid content of diverse proteins, for example, *Amino Acid Content of Foods and Biological Data on Proteins;* Food and Agricultural Organization of the United Nations, No. 24, 1970. In this manner, it is possible to nutritionally balance all amino acids to any desired or optimum level. Therefore, it is understood that this invention encompasses all proteinaceous foodstuffs which are deficient in amino acids, even when that deficiency is not first limiting.

Other proteinaceous foodstuffs contemplated by this invention include, among the oil seeds: peanut, cottonseed, soybean, safflower, sesame, sunflower, rapeseed and flax meal (linseed meal); among the milk protein products: casein, non-fat milk solids, lactalbumin, or whey protein; among the cereal grains: whey (gluten), wheat, corn, barley, oats, rice, rye, wheat bran, and wheat germ; among the marine proteins: fish protein concentrate, and fish muscles soluble; among the plant proteins: leaf (e.g. alfalfa) and coconut; among the single-cell proteins: yeast, and petroleum, methane and carbohydrate feeding microbes; among the animal proteins: collagen (gelatin), keratin, muscle, serum protein, offal, wool, silk waste, meat protein concentrate, and feather meal. Also contemplated by this invention are manufactured proteinaceous foodstuffs formulated in part from selected proteins from the above representative enumeration. In this respect it is understood that the proteinaceous source material may be fortified directly, and thereby provide a nutritionally balanced proteinaceous foodstuff useful either alone or in combination with other ingredients as a manufactured foodstuff; or fortification may be effected during formulation of the manufactured proteinaceous foodstuff.

Knowing the composition of the proteinaceous foodstuff which it is desired to supplement with the amino acid food additive cocrystallate described herein and the level to which it is desired to supplement the foodstuff, a person of ordinary skill in the art will have no difficulty in determining how much of a particular cocrystallate should be used. In general it will be found that an amount of cocrystallate which is from about 0.1% to about 5% by weight of the protein level of the food to be supplemented will be satisfactory. A preferred range is from about 0.5% to about 2.5% by weight of the protein in the foodstuff. Amounts outside these ranges can, however, be used if the desired supplementation can thereby be achieved.

The following examples of additives and peanut butter proteinaceous foodstuffs fortified with amino acid food additives are given to indicate preferred products contemplated in the instant invention. It is, of course, to be understood that those examples are by way of illustration only, and in no way are to be considered as limiting the scope of the invention. Some of the following examples were subjected to a Rapid Aging Test.

DESCRIPTION OF RAPID AGING TEST

1. A sample is placed in a headspace flask and the flask sealed.

2. The sealed flask is placed in an oil bath maintained at 90° C. for 16 hours.

3. The flask is cooled to room temperature, 30 ml. of water added and the flask placed in an oil bath maintained at 45° C. for 15 minutes.

4. The headspace was analyzed using a modified version of the procedure described by von Sydow, E., Anderson, J., Anjou, K., Karlsson, G., Land, D. and Griffiths, N., Lebensm., Wiss. u. Technol., Vol. 3 (1970), 11–12. The headspace sample was transferred from the headspace flask to the cold trap by passing nitrogen over the sample contained in the flask at a flow rate of 50 ml/min.

EXAMPLE 1

The following materials were combined:
Solvent
  400 grams of water
Amino acid materials
  59 grams of L-lysine hydrochloride
  31 grams of N-acetyl L-methionine
  20 grams of L-threonine
Cocrystallizer material
  120 grams sodium chloride The amino acid materials and cocrystalizer material were dissolved in 400 grams of 150° F. water. All solids dissolved. The solution was frozen for 24 hours at 0° F. and placed in a vacuum freeze dryer for 24 hours. At the end of this period all of the water had been evaporated and a dry stable, uniform, dehydrated cocrystalline solid matrix remained. This was ground and added to a formula consisting of: peanut paste, sugar, molasses, stabilizer and emulsifier at a level of 23 grams of the improved cocrystalline amino acid food additive to 1000 grams of peanut butter mix. This level should give a protein efficiency ratio of 2.5. A control peanut butter consisting of the same ingredients and substituting sodium chloride for the cocrystallized material to obtain an equivalent sodium chloride level was prepared. These two materials were paneled by expert panelists and were determined to be equal in flavor.

EXAMPLE 2

A dehydrated uniform cocrystalline amino acid food additive was produced by mixing:
  240 grams of sodium chloride
  118 grams of L-lysine hydrochloride
  62 grams of N-acetyl L-methionine (NALM)
  42 grams of L-threonine
  800 grams of water at 150° to solubilize all the materials. This solution was freeze dried for 24 hours.

EXAMPLE 3

A second dehydrated uniform cocrystalline amino acid additive was prepared by making the same mixture as in Example 2 and then neutralizing with sodium hydroxide to a pH of 6.8. This solution was also freeze dried to provide an additive cocrystallate containing the sodium salts of the amino acid materials.

Peanut butter was produced consisting of peanut—90%, sugar—5.8%, stabilizer—1.4%, emulsifier—0.7%, molasses—0.5%. No salt (NaCl) was added to this material. This batch was then separated into four equal portions. The first portion of the material was mixed with 1.2% sodium chloride and prepared as peanut butter. The second batch was mixed with 2.2% cocrystallate (Example 3) food additive comprising the sodium salts of the amino acid materials plus 0.1% free sodium chloride. The third batch was mixed with the 2.3% cocrystallized (Example 2) amino acids without neutralization and the fourth batch was mixed with 1.2% sodium chloride, 0.58% lysine, 0.3% N-acetyl L-methionine, and 0.2% L-threonine. All four of the finished peanut butters contained an equal amount of sodium chloride and equal levels of amino acids, except the control. A direct flavor comparison between the products containing the cocrystalline salts of the amino acids and the cocrystalline amino acids with the products made with the free amino acid solution showed an average of 2 flavor grade improvement in overall flavor between the cocrystalline amino acid food additives and the direct amino acid addition. The cocrystalline amino acid food additive fortified peanut butters were preferred by a panel of expert tasters. A flavor grade of 1 is considered as significant.

A number of embodiments of the present invention are set out in Table II.

TABLE II

| Example | Components Dissolved in 400 gm. 150° F. water | Drying Time and Comments |
| --- | --- | --- |
| 4 | 50 gm. L-lysine-HCl<br>150 gm. sucrose | dried in 24 hr.<br>freeze dryer |
| 5 | 50 gm. L-threonine<br>150 gm. sucrose | dried in 24 hr.<br>freeze dryer |
| 6 | 50 gm. NALM<br>150 gm. sucrose | did not dry after 39 hr. |
| 7 | 30 gm. L-lysine-HCl<br>15.5gm. NALM<br>10 gm. L-threonine<br>150 gm. sucrose | required 39 hr. to dry |
| 8 | 25 gm. NALM<br>150 gm. sucrose | dried in 24 hr. |
| 9 | 31 gm. NALM<br>120 gm. NaCl | dried in 24 hr. |
| 10 | 50 gm. NALM<br>100 gm. NaCl | dried in 24 hr. |
| 11 | 59 gm. L-lysine-HCl<br>31 gm. NALM<br>20 gm. L-threonine<br>120 gm. NaCl | dried in 24 hr. |

The Significance of a More Stable and Better-tasting Amino Acid Food Additive with Low Hygroscopicity

EXAMPLE 12

Sodium NALM, NaCl, Melted Fat, Spread Over the Surface of Extrudate

Two grams of NaCl and 0.5 g of NALM were dissolved in 30 ml of water and the pH of the solution brought to 6.75 by the addition of 0.1 N NaOH. The resulting solution was freeze dried. Eight tenths of a gram of the resulting freeze-dried cocrystallate was added to 4 g of melted fat, saturated triglyceride, mix contained in a test tube immersed in a silicone bath maintained at 80° C. A fine stream of nitrogen was bubbled through the melted fat in order to suspend the sodium NALM-NaCl cocrystallate. One and two tenths grams of the suspension were dripped on the surface of 3.75 g of freeze-dried soy meal based meat analog extrudate using a transfer pipet. The resulting sample was used in the rapid aging test.

EXAMPLE 13

NALM, Melted Fat, Spread Over the Surface of Extrudate

Three hundred and thirty-nine mg of finely ground NALM were added to 10 g of melted fat mix in a test tube immersed in a silicone oil bath maintained at 65° C. Suspension of the NALM was achieved by bubbling a fine stream of nitrogen through the melted fat. One and three tenths grams of the suspension were dripped on the surface of 3.75 g of freeze-dried soy meal based meat analog extrudate using a transfer pipet. The resulting sample was subjected to the rapid aging test.

EXAMPLE 14

Aqueous NALM, Extrudate (freeze-dried)

NALM (0.113 g) was dissolved in 30 ml of water and the solution added to 15 g of soy meal based meat analog extrudate contained in a plastic dish. The extrudate was stirred until nearly all of the solution was absorbed and then freeze-dried. The freeze-dried sample was ground with a mortar and pestle and 3.75 g were subjected to the rapid aging test.

EXAMPLE 15

Aqueous Sodium NALM, Extrudate (freeze-dried)

NALM (0.113 g) was dissolved in 15 ml of water and the pH of the solution brought to 6.75 by the addition of 0.1 N sodium hydroxide solution. The solution was diluted to 30 ml and added to 15 g of soy meal based meat analog extrudate. The extrudate was stirred until nearly all of the solution was absorbed. After freeze drying, the sample was ground with a mortar and pestle, and 3.9 g of the ground sample was used in the rapid aging test.

EXAMPLE 16

Aqueous Sodium NALM, NaCl, Extrudate (freeze-dried)

One hundred and thirteen mg of NALM and 0.4 g of NaCl were dissolved in 15 ml of water. The pH of the solution was brought to 6.75 by the addition of 0.1 N sodium hydroxide, diluted to 30 ml and added to 15 g of soy meal based meat analog extrudate. The extrudate was stirred until nearly all of the solution was absorbed, then freeze dried. The freeze-dried sample was ground with a mortar and pestle and 3.9 g of the ground sample was used in the rapid aging test.

EXAMPLE 17

Sodium NALM-NaCl (cocrystallate, Extrudate (dry ingredients ground together)

Three and seventy-five hundredths g of freeze-dried soy meal based meat analog extrudate and 0.193 g of a freeze-dried mixture of sodium NALM and NaCl (1:4-sodium NALM:NaCl) were ground together in a mortar and pestle. The resulting sample was used in the rapid aging test.

EXAMPLE 18

NALM, Extrudate (dry ingredients ground together)

Thirty-eight mg of NALM and 3.75 g of freeze-dried extrudate were ground together with a mortar and pestle. The resulting sample was used in the rapid aging test.

EXAMPLE 19

Peanut Butter+NALM

Fifteen g of peanut butter were heated at 90° C., 38 mg of NALM added, the mixture stirred with a magnetic stirrer and subjected to the rapid aging test.

EXAMPLE 20

Peanut Butter+Sodium NALM-NaCl (cocrystallate)

The experiment described in 19 above was repeated substituting 0.199 g of a sodium NALM-NaCl mixture (1–4 ratio) for the NALM.

TABLE III

GENERATION OF VOLATILE SULFUR COMPOUNDS IN THE RAPID AGING TEST (90° C., 16 hours)

| Samples Subjected to Rapid Aging Test | Hydrogen Sulfide | Methyl Mercaptan | Dimethyl Sulfide | Dimethyl Disulfide |
|---|---|---|---|---|
| | Volatile Sulfur Compounds Formed in Headspace | | | |
| | Peak area measurements (sulfur detector response × $10^3$) | | | |
| 12. Sodium NALM, NaCl cocrystallate, melted fat, spread over the surface of extrudate | 0 | 0 | 2 | 0 |
| 13. NALM, melted fat, spread over the surface of extrudate | 21 | 1 | 105 | 81 |
| 14. Aqueous solution of NALM, spread on extrudate (freeze-dried) | 0 | 0 | 285 | 1 |
| 15. Aqueous solution of sodium NALM, spread on extrudate (freeze-dried) | 11 | 0 | 584 | 45 |
| 16. Aqueous solution of sodium NALM, NaCl, spread on extrudate (freeze-dried) | 35 | 0 | 850 | 25 |
| 17. Sodium NALM-NaCl (cocrystallate) extrudate (dry ingredients ground together) | 14 | 4 | 33 | 33 |
| 18. NALM, extrudate (dry ingredients ground together) | 0 | 75 | 143 | 824 |
| 19. Peanut butter + NALM | 247 | 427 | 410 | 5 |
| 20. Peanut Butter + sodium NALM-NaCl (cocrystallate) | 0 | 17 | 150 | 0 |

Sodium NALM-NaCl cocrystallate suspended in melted fat, saturated triglyceride, and coated on the surface of dry extrudate is stable in a rapid aging test, whereas NALM is not.

Decomposition is pronounced when aqueous solutions of NALM, sodium NALM, or sodium NALM plus NaCl are intimately mixed with extrudate and subjected to the rapid aging test (Table III, Examples 14, 15 and 16).

Some decomposition occurs when a sodium NALM-NaCl cocrystallate is dry mixed with extrudate and subjected to the rapid aging test, but this composition is much more stable than a dry mix of NALM-extrudate mixture.

Decomposition is pronounced when a peanut butter composition containing NALM is subjected to a rapid aging test. Considerably less decomposition occurs when the same peanut butter composition containing sodium NALM-NaCl cocrystallate is used (Table III, Examples 19 and 20, respectively).

The superior stability of the low hygroscopic Na-NALM-NaCl cocrystallate applied to meat-analog extrudate as compared to comparable amounts of other amino acid materials including NALM itself, or Na-NALM, is dramatically demonstrated by these tests.

What is claimed is:

1. A dry, stable amino acid food additive comprising: a uniform cocrystalline matrix of:
   (1) an amino acid material; and
   (2) a soluble edible cocrystallizer material, the ratio by weight of the cocrystallizer to the amount of edible amino acid being from 0.9:1 to about 6:1, said cocrystallizable material being selected from the group consisting of edible alkaline and alkali earth metal salts of halides, phosphates and nitrates, crystalline starches, crystalline cellulose, crystalline sugars, crystalline polyhydric alcohols and mixtures thereof;

wherein said amino acid material is selected from the group consisting of:
   N-acyl derivatives of L-methionine,
   N-acyl derivatives of cystine and cysteine,
   N-acetyl L-methionine,
   N-acetyl derivatives of L-methionine,
   N-acetyl derivatives of L-cystine,
   N-acetyl derivatives of L-cysteine,
   N,N'-diacetyl L-cystine,
   N-acetyl L-cysteine,
   their salts, and mixtures thereof, and wherein the N-acyl substituent is derived from a fatty acid having from 1 to 24 carbon atoms.

2. A proteinaceous foodstuff comprising an edible amino acid deficient protein and a nutritionally supplemental amount of an amino acid food additive according to claim 1.

3. The foodstuff of claim 2 wherein said amino acid material is N-acyl-L-methionine.

4. The foodstuff of claim 3 where the acyl group is derived from fatty acids having from 1 to 4 carbon atoms.

5. The foodstuff of claim 2 wherein the amino acid material is a salt selected from the group consisting of salts of N-formyl L-methionine, N-formyl L-methionine ethyl ester, N-acetyl L-methionine and N-acetyl L-methionine ethyl ester.

6. A method for making a non-hygroscopic amino acid food additive comprising:
   (a) forming an aqueous solution of an amino acid material and a soluble edible cocrystallizer material, the ratio of cocrystallizer to edible amino acid being in the range of from 0.9:1 to about 6:1, said cocrystallizer material being selected from the group consisting of edible alkaline and alkali earth metal salts of halides, phosphates and nitrates, crystalline starches, crystalline cellulose, crystalline sugars, crystalline polyhydric alcohols, and mixtures thereof; and
   (b) dehydrating said solution to form a dehydrated amino acid food additive cocrystallate;

wherein said amino acid material is selected from the group consisting of:
   N-acyl derivatives of L-methionine,
   N-acyl derivatives of cystine and cysteine,
   N-acetyl L-methionine,
   N-acetyl derivatives of L-methionine,
   N-acetyl derivatives of L-cystine,
   N-acetyl derivatives of L-cysteine,
   N,N'-diacetyl L-cystine,
   N-acetyl L-cysteine,
   their salts, and mixtures thereof, and wherein the N-acyl substituent is derived from a fatty acid having from 1 to 24 carbon atoms.

* * * * *